United States Patent
Larson

(10) Patent No.: US 9,962,036 B2
(45) Date of Patent: May 8, 2018

(54) COMPRESSIBLE GRILL WITH PIVOTING BOTTOM

(71) Applicant: Lisa Lynn Larson, Erie, PA (US)

(72) Inventor: Lisa Lynn Larson, Erie, PA (US)

(*) Notice: Subject to any disclaimer, the term of this patent is extended or adjusted under 35 U.S.C. 154(b) by 331 days.

(21) Appl. No.: 14/566,227

(22) Filed: Dec. 10, 2014

(65) Prior Publication Data
US 2016/0166107 A1 Jun. 16, 2016

(51) Int. Cl.
*A47J 37/07* (2006.01)

(52) U.S. Cl.
CPC ....... *A47J 37/0763* (2013.01); *A47J 37/0704* (2013.01); *A47J 2037/0777* (2013.01)

(58) Field of Classification Search
CPC ................ A47J 2037/0777; A47J 37/0763
USPC ........................................ 126/9 B, 9 R, 30
See application file for complete search history.

(56) References Cited

U.S. PATENT DOCUMENTS

| | | | | |
|---|---|---|---|---|
| 2,424,665 A | * | 7/1947 | Pope, Sr. | F24B 1/205 110/241 |
| 2,860,624 A | * | 11/1958 | Eddy | A47J 37/0763 126/211 |
| 4,149,514 A | * | 4/1979 | Latouf | A47J 37/0704 126/25 R |
| 6,026,802 A | * | 2/2000 | Patterson | F24C 1/16 126/201 |

* cited by examiner

*Primary Examiner* — Avinash Savani
*Assistant Examiner* — Aaron Heyamoto
(74) *Attorney, Agent, or Firm* — Dunlap Bennett & Ludwig PLLC

(57) ABSTRACT

A portable fire pit grill is provided. The grill includes a housing formed by at least one sidewall. The sidewall includes a top end forming a top opening and a bottom end forming a bottom opening forming an internal housing within. The present invention further includes a grate covering the top opening of the sidewall. A bottom plate is pivotally attached to the bottom end of the sidewall. The bottom plate includes an opened position and a closed position. The opened position includes the bottom plate pivoted away from the bottom end and the closed position includes the bottom plate pivoted towards the bottom end and thereby covering the bottom opening.

6 Claims, 3 Drawing Sheets

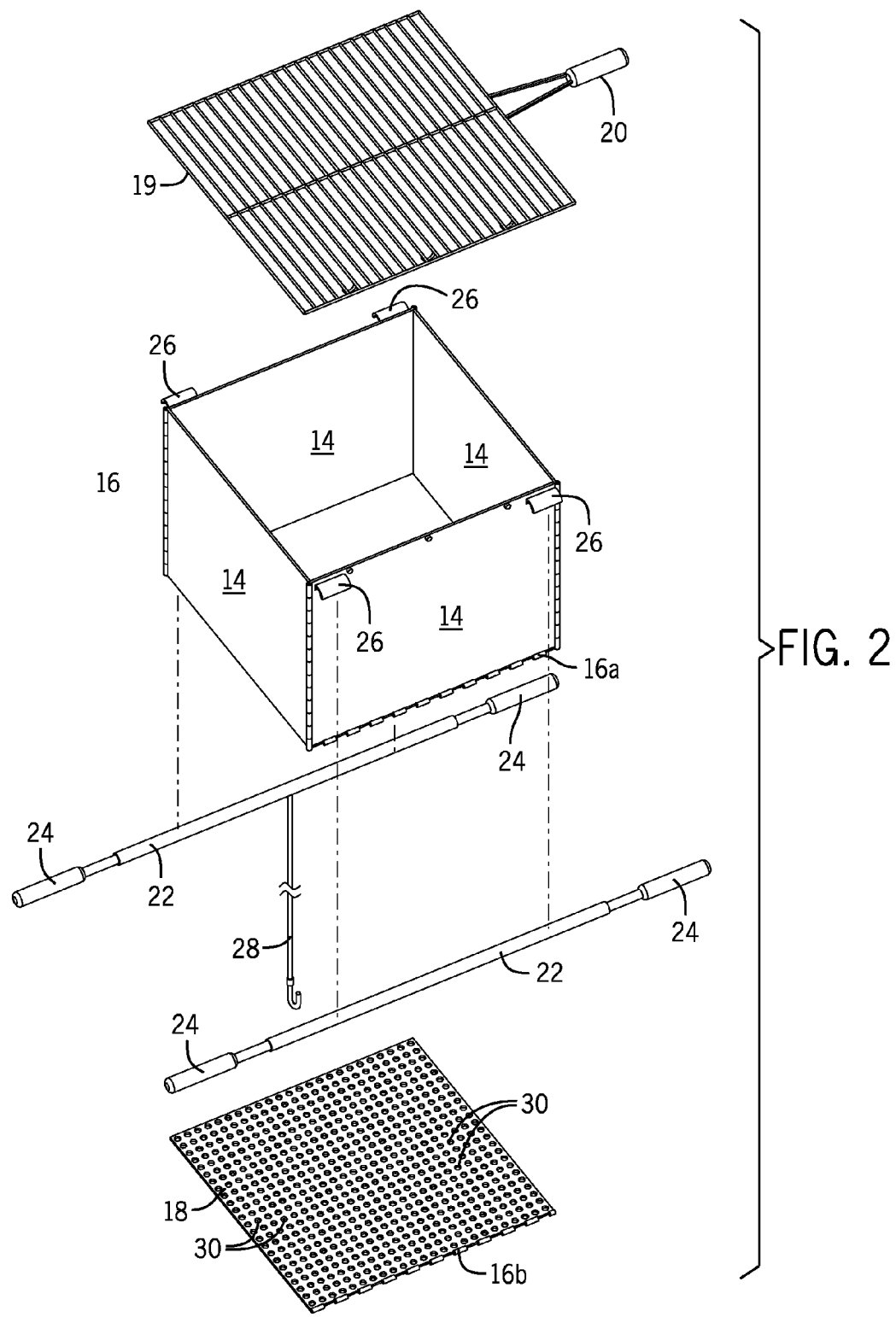

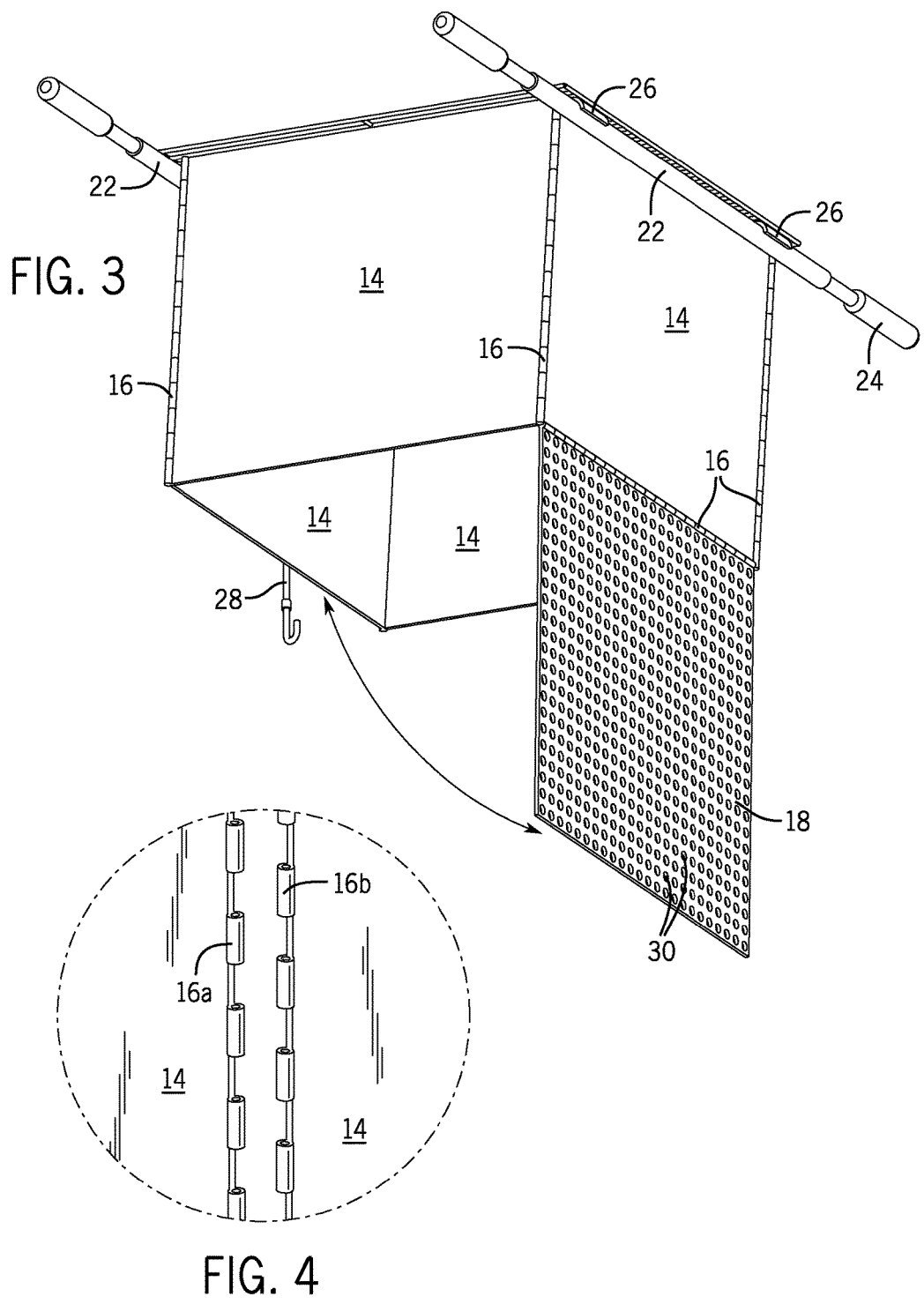

COMPRESSIBLE GRILL WITH PIVOTING BOTTOM

BACKGROUND OF THE INVENTION

The present invention relates to a portable grill and, more particularly, to a portable grill with a pivoting bottom plate.

A barbecue grill is a device for cooking food by applying heat directly from below. There are several varieties of such grills, with most falling into one of two categories: gas-fueled and charcoal. Grills may also be used with fire pits during a camping trip. However, grills are bulky and are not easily portable, making them inconvenient to transport and store.

As can be seen, there is a need for a portable grill that may be used with fire pits.

SUMMARY OF THE INVENTION

In one aspect of the present invention, a portable fire pit grill comprises: at least one sidewall comprising a top end forming a top opening, and a bottom end forming a bottom opening, wherein the sidewall forms an internal housing within; a grate formed to cover the top opening; and a bottom plate pivotally attached to the bottom end of the sidewall and comprising an opened position and a closed position, wherein the opened position comprises the bottom plate pivoted away from the bottom end and the closed position comprises the bottom plate pivoted towards the bottom end and thereby covering the bottom opening.

These and other features, aspects and advantages of the present invention will become better understood with reference to the following drawings, description and claims.

BRIEF DESCRIPTION OF THE DRAWINGS

FIG. 2 is an exploded perspective view of an embodiment of the present invention;

FIG. 3 is a bottom perspective view of the present invention in an opened position; and FIG. 4 is a detail exploded perspective view of a hinge of the present invention.

DETAILED DESCRIPTION OF THE INVENTION

Figure 1:
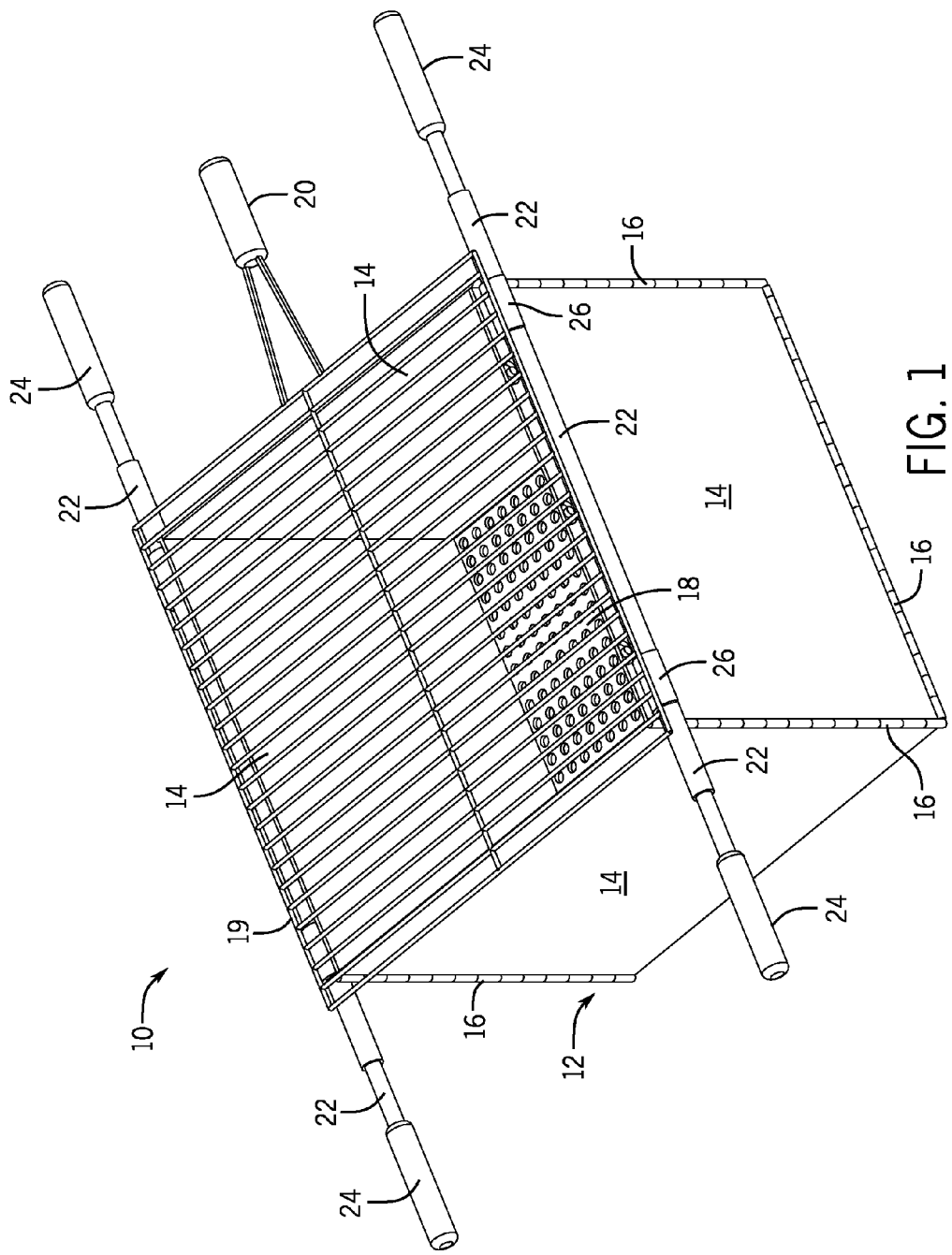
FIG. 1 is a top perspective view of an embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a portable fire pit barbeque that fits on fire ring. The present invention is charcoal burning, collapsible, and releases at the bottom to discard charcoal briquettes. The present invention is easy to transport to camp sites and is collapsible for easy storage. Further, due to the bottom release, the present invention prevents hot embers from causing damage. The grill of the present invention may include a metal box hinged on four corners with handles that may extend about eight inches past a fire ring. The bottom side is hinged on one side to the metal box for an easy pivoting release.

Referring to FIGS. 1 through 4, the present invention includes a portable fire pit grill 10. The grill 10 includes a housing 12 formed by at least one sidewall 14. The sidewall includes a top end forming a top opening and a bottom end forming a bottom opening forming an internal housing within. The present invention further includes a grate 19 covering the top opening of the sidewall 14. A bottom plate 18 is pivotally attached to the bottom end of the sidewall 14. The bottom plate 18 includes an opened position and a closed position. The opened position includes the bottom plate 18 pivoted away from the bottom end and the closed position includes the bottom plate 18 pivoted towards the bottom end and thereby covering the bottom opening.

In certain embodiments, the bottom plate 18 may include a plurality of apertures 30. The apertures 30 may be formed through the surface of the plate 18. The apertures 30 may be evenly distributed throughout the entire plate 18. Due to the apertures 30, the grill 10 of the present invention may be used on a fire pit grill 10. Coals may be loaded into the housing 12 and the bottom plate 18 may be placed over a fire. The fire may ignite the coals through the apertures 30.

The present invention may further include handles 20, 22 for manipulating the grill 10. In certain embodiments, the present invention may include a grate handle 20 extending laterally from the side of the grate 19. Therefore, the user may easily grasp and remove or place the grate 19 onto the top end of the sidewall 14. The present invention may further include a plurality of grill handles 22 releasably attachable to the top end of the sidewall 14. The handles 22 may include elongated posts. The top end of the sidewall 14 may include lugs 26 on either side. The grill handles 22 may secure to the lugs 26. The grill handles 22 may further include rubber grips 24 on either end. Therefore, the grill 10 may be carried using the grips 24 even if the grill 10 is hot.

The present invention may further include a latch 28. The latch 28 may releasably secure the bottom plate 18 in the closed position. In certain embodiments, the latch 28 may include a hook that is disposed on the opposite end of the pivotal connection between the bottom plate 18 and the bottom end of the sidewall 14. In such embodiments, the hook may extend from one of the grill handles 22. The hook may be inserted into at least one of the apertures 30 to secure the bottom plate 18 in the closed position. The hook may be removed from the aperture 30 and the bottom plate 18 may freely pivot away from the bottom end into the opened position.

In certain embodiments, the sidewall 14 of the present invention may include four sidewalls 14 connected together. Each of the sidewalls 14 includes two side edges. Each of the two side edges is pivotally attached to a side edge of an adjacent sidewall 14 forming a parallelogram, such as a square or rectangle. The sidewalls 14 may connect to one another by a hinge 16. Further, the bottom plate 18 may connect with one of the sidewalls 14 by a hinge 16. The hinge 16 of the present invention may include interlocking barrels 16a, 16b connected together by a hinge pin.

In use, the bottom plate 18 of the grill 10 may be placed over a fire. Coals may be placed within the housing 12 and may rest on the bottom plate 18. The coals may ignite from the fire. The grate 19 may be placed on the top end of the sidewalls 14 to cover the top opening. A user may then cook by placing food items on the grate 18. Once finished cooking, the latch 28 may unhook the bottom plate 18 so that the bottom plate 18 may pivot freely relative to the sidewalls 14. Therefore, the coal may be easily dumped from the bottom of the grill 10 and into the fire pit. The sidewalls 14 may then pivot relative to one another along the hinges 16 from an expanded position to a compressed position. The expanded position may include the sidewalls 14 disposed at around a 90 degree angle relative to one another and the compressed position may include the sidewalls 14 being in either a 0 degree angle or a 180 degree angle relative to one another. Therefore, the compressed position includes a substantially flattened grill 10 that may be easily transported.

It should be understood, of course, that the foregoing relates to exemplary embodiments of the invention and that modifications may be made without departing from the spirit and scope of the invention as set forth in the following claims.

What is claimed is:

1. A portable grill comprising:
   at least one sidewall comprising a top end forming a top opening, and a bottom end forming a bottom opening;
   a plurality of grill handles releasably attached to the top end of the sidewall;
   a grate covering the top opening;
   a bottom plate comprising a plurality of apertures, and a first side opposite a second side, wherein the first side is pivotally attached to the bottom end of the sidewall; and
   a hook extending from one of the plurality of grill handles, wherein the hook is inserted into at least one of the plurality of apertures of the bottom plate,
   wherein an opened position comprises the hook detached from the bottom plate so that the bottom plate pivots away from the bottom end, thereby uncovering the bottom opening, and the closed position comprises the bottom plate pivoted towards the bottom end and covering the bottom opening.

2. The portable grill of claim 1, further comprising a grate handle extending laterally from the grate.

3. The portable grill of claim 1, wherein the at least one sidewall comprises four sidewalls.

4. The portable grill of claim 3, wherein each of the four sidewalls comprises two side edges, wherein each of the two side edges is pivotally attached to a side edge of an adjacent sidewall forming a parallelogram.

5. The portable grill of claim 4, wherein the side edges are pivotally attached to one another by a hinge.

6. The portable grill of claim 4, wherein the four sidewalls pivot relative to one another from an expanded position to a compressed position.

* * * * *